(12) United States Patent
Miller et al.

(10) Patent No.: US 11,994,793 B1
(45) Date of Patent: May 28, 2024

(54) CAMERA WITH END STOP BUMPER

(71) Applicant: Apple Inc., Cupertino, CA (US)

(72) Inventors: Scott W. Miller, Los Gatos, CA (US); Brad V. Johnson, Santa Clara, CA (US); Nicholas D. Smyth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 477 days.

(21) Appl. No.: 16/714,380

(22) Filed: Dec. 13, 2019

Related U.S. Application Data

(60) Provisional application No. 62/780,101, filed on Dec. 14, 2018.

(51) Int. Cl.
| | |
|---|---|
| G03B 5/00 | (2021.01) |
| G02B 7/02 | (2021.01) |
| G02B 7/04 | (2021.01) |
| G02B 27/64 | (2006.01) |
| G03B 13/36 | (2021.01) |

(52) U.S. Cl.
CPC ............... *G03B 5/00* (2013.01); *G02B 7/021* (2013.01); *G02B 7/04* (2013.01); *G02B 27/646* (2013.01); *G03B 13/36* (2013.01); *G03B 2205/0069* (2013.01)

(58) Field of Classification Search
CPC .. G03B 5/00; G03B 13/36; G03B 2205/0069; G03B 2205/0015; G02B 7/021; G02B 7/04; G02B 27/646; G02B 7/08; G02B 13/0035; G02B 27/64; G02B 7/02; H04N 5/2252; H04N 5/232121; H04N 23/687; H04N 23/57

USPC ........ 359/557, 823–824, 554, 694, 696, 814
See application file for complete search history.

(56) References Cited

U.S. PATENT DOCUMENTS

| | | | |
|---|---|---|---|
| 7,271,511 | B2 | 9/2007 | Osaka |
| 7,787,046 | B2 | 8/2010 | Nagasaki |
| 8,611,735 | B2 | 12/2013 | Sekimoto |
| 9,049,366 | B2 | 6/2015 | Zhang |

(Continued)

FOREIGN PATENT DOCUMENTS

| | | |
|---|---|---|
| CN | 1873513 | 12/2006 |
| CN | 103246125 | 8/2013 |

(Continued)

OTHER PUBLICATIONS

Unknown, "Mini Photo Pro Lens Kit", Retrieved from https://www.restorationhardware.com/catalog/product/product.isp?productId=prod4640185 on Dec. 18, 2019, pp. 1-2.

(Continued)

*Primary Examiner* — Thomas K Pham
*Assistant Examiner* — Kuei-Jen L Edenfield
(74) *Attorney, Agent, or Firm* — Robert C. Kowert; Kowert, Hood, Munyon, Rankin & Goetzel, P.C.

(57) ABSTRACT

Various embodiments include a camera having one or more end stop bumpers. In some embodiments, the end stop bumper(s) may be at least partially disposed between a suspension platform of a camera and a lateral end stop defined by a stationary structure of the camera. The end stop bumper(s) may be configured to cushion movement of the suspension platform as the suspension platform approaches the lateral end stop. In some embodiments, the end stop bumper(s) may be part of a suspension spring structure coupled to the suspension platform.

20 Claims, 8 Drawing Sheets

(56) References Cited

U.S. PATENT DOCUMENTS

| | | |
|---|---|---|
| 9,554,023 B2 | 1/2017 | Park |
| 10,018,800 B2 | 7/2018 | Cheng |
| 10,317,649 B2 | 6/2019 | Sharma |
| 11,350,018 B2 | 5/2022 | Sharma |
| 2007/0257989 A1 | 11/2007 | Shirono |
| 2007/0279497 A1 | 12/2007 | Wada |
| 2008/0031605 A1 | 2/2008 | Akada |
| 2008/0129830 A1 | 6/2008 | Inoue et al. |
| 2010/0079604 A1 | 4/2010 | Washisu |
| 2011/0279916 A1 | 11/2011 | Brown |
| 2012/0075519 A1 | 3/2012 | Blasch |
| 2012/0229926 A1* | 9/2012 | Wade ............ G02B 7/04 359/823 |
| 2013/0142502 A1 | 6/2013 | Kang |
| 2013/0163974 A1* | 6/2013 | Takei ............ G03B 5/00 396/55 |
| 2014/0043496 A1 | 2/2014 | Azuma |
| 2014/0232888 A1* | 8/2014 | Sekimoto ............ G03B 5/00 348/208.11 |
| 2015/0296143 A1 | 10/2015 | Kang |
| 2015/0350499 A1 | 12/2015 | Topliss |
| 2016/0014339 A1 | 1/2016 | Miller |
| 2017/0150022 A1 | 5/2017 | Shigemitsu |
| 2017/0153409 A1 | 6/2017 | Chan |
| 2018/0348469 A1 | 12/2018 | Son et al. |

FOREIGN PATENT DOCUMENTS

| | | |
|---|---|---|
| CN | 204422843 | 6/2015 |
| CN | 104836941 | 8/2015 |
| CN | 104902149 | 9/2015 |
| CN | 105301871 | 2/2016 |
| CN | 105739051 | 7/2016 |
| CN | 105899990 | 8/2016 |
| CN | 206411316 | 8/2017 |
| CN | 207573455 | 7/2018 |
| WO | 2013027927 | 2/2013 |

OTHER PUBLICATIONS

U.S. Appl. No. 17/664,543, filed May 23, 2022, Shashank Sharma.

* cited by examiner

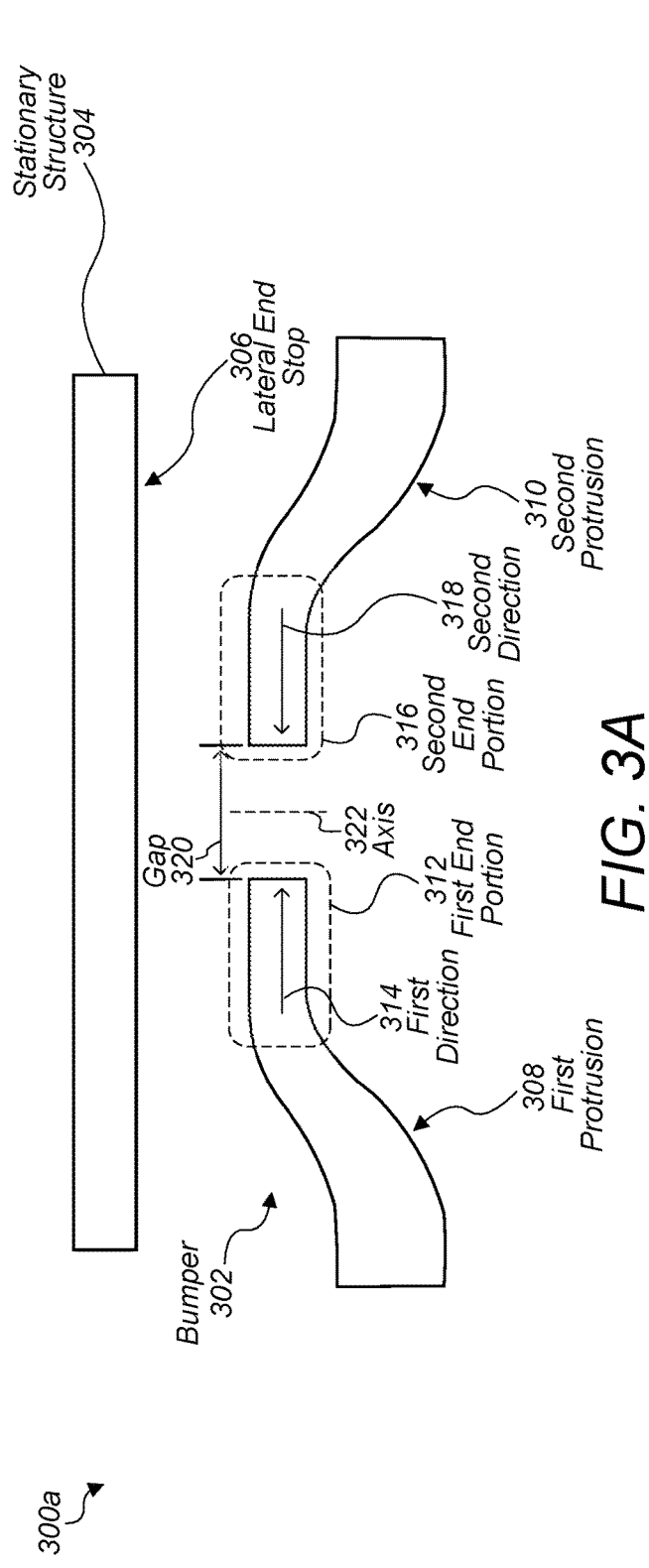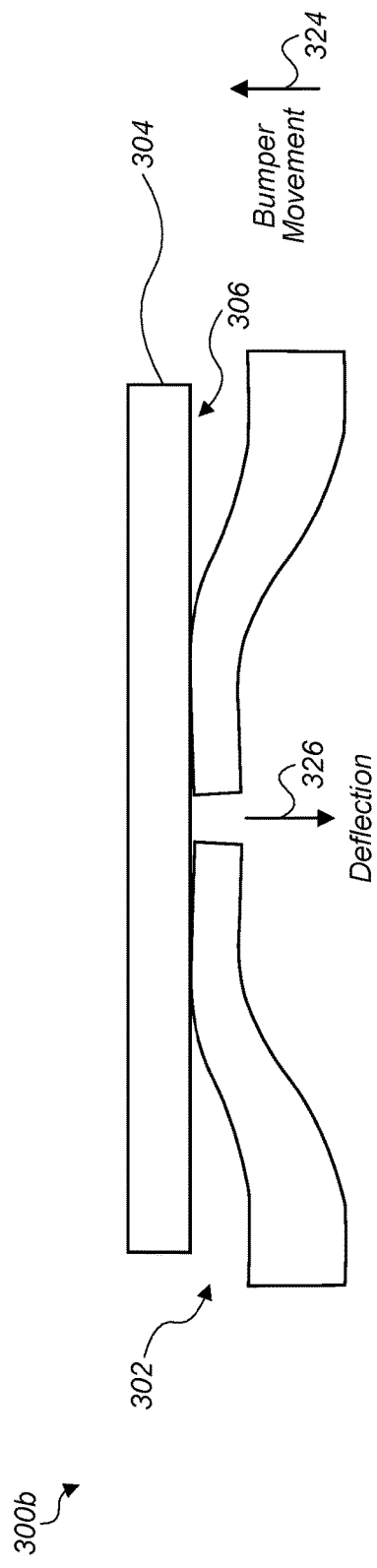
FIG. 3A
FIG. 3B

CAMERA WITH END STOP BUMPER

BACKGROUND

This application claims benefit of priority to U.S. Provisional Application No. 62/780,101, filed Dec. 14, 2018, titled "Camera with End Stop Bumper", which is hereby incorporated by reference in its entirety.

TECHNICAL FIELD

This disclosure relates generally to architecture for a camera having one or more end stop bumpers to cushion movement of a suspension platform as it approaches a lateral end stop.

DESCRIPTION OF THE RELATED ART

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIGS. 3A and 3B each illustrates a respective schematic top view of an example end stop bumper and a lateral end stop of a camera, in accordance with some embodiments. FIG. 3A illustrates an example in which the end stop bumper is not in contact with the lateral end stop. FIG. 3B illustrates an example in which the end stop bumper is in contact with the lateral end stop.

Figure 1:
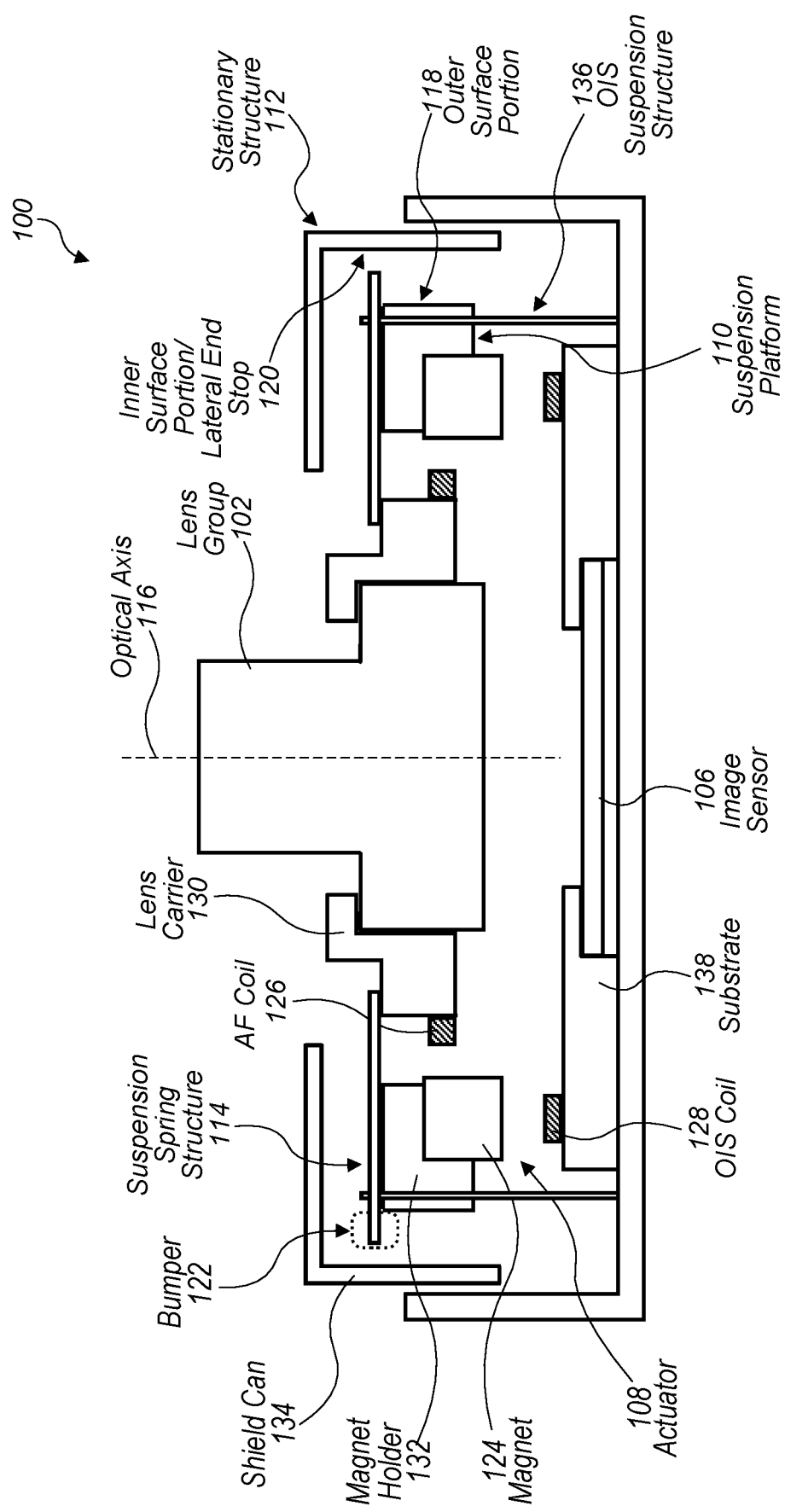
FIG. 1 illustrates a side cross-sectional view of an example camera having a suspension spring structure with an end stop bumper, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with one or more end stop bumpers that may be used to cushion movement of a suspension platform of the camera. In some examples, the end stop bumper(s) may interface with a stationary structure of the camera to cushion movement of the suspension platform before the suspension platform reaches a lateral end stop defined by the stationary structure. Additionally, or alternatively, the end stop bumper(s) may cushion movement of the suspension platform as the suspension platform approaches the stationary structure. In some embodiments, the end stop bumper(s) may be part of a suspension spring structure coupled to the suspension platform. The end stop bumper(s) may prevent an undesirable collision between the suspension platform and the lateral end stop (e.g., as a result of a drop event) that may damage the camera, negatively impact camera performance, and/or negatively impact user experience. For example, an undesirable "clicking" sound may be produced if the suspension platform contacts the lateral end stop. The end stop bumper(s) may provide acoustic mitigation to prevent or lessen such wanted acoustics. Furthermore, in some examples, the end stop bumper(s) may be used to enforce a sufficient amount of clearance between the suspension platform and the stationary structure, so as to limit an amount of electrostatic charge accumulation on the suspension platform and/or the stationary structure.

In some embodiments, a camera may include a lens group, an image sensor, an actuator, a suspension platform, a stationary structure, and/or an end stop bumper (also referred to herein as a "bumper"). As used herein, a lens group may include one or more lens elements. The image sensor may capture light that passes through the lens group. The actuator may move the lens group relative to the image sensor.

In some examples, the suspension platform may be coupled to the lens group. For example, the suspension platform may be coupled to the lens group such that the suspension platform and the lens group are moveable together, e.g., in a direction orthogonal to the optical axis. Furthermore, the suspension platform may include an outer surface portion. In some embodiments, the stationary structure may include an inner surface portion. The inner surface portion of the stationary structure may define a lateral end stop with respect to movement of the suspension platform, e.g., in the direction orthogonal to the optical axis.

In some examples, the bumper may be at least partially disposed between the outer surface portion of the suspension platform and the lateral end stop (defined by the inner surface portion of the stationary structure). The bumper may be used to cushion movement of the suspension platform before the outer surface of the suspension platform reaches the lateral end stop.

In some examples, the bumper may be part of a suspension spring structure. The suspension spring structure may be coupled to the suspension platform. In some embodiments, the suspension spring structure may extend along a plane that is orthogonal to the optical axis. Furthermore, the suspension spring structure may suspend the lens group within the suspension platform and guide movement of the lens along the optical axis in a controlled manner in some examples.

In some examples, the actuator may include a coil and a magnet. For instance, the actuator may be a voice coil motor (VCM) actuator. The camera may include a lens carrier to which the lens group is fixedly attached. The suspension platform may include a magnet holder to which the magnet is attached. Furthermore, the suspension spring structure may couple the lens carrier with the magnet holder. For example, the suspension spring structure may couple the lens carrier with the magnet holder such that the lens carrier is moveable (e.g., along the optical axis) relative to the magnet holder.

In some examples, the stationary structure may include a shield can that at least partially encompasses the suspension platform. The shield can may be stationary relative to movement of the suspension platform.

In some examples, the actuator may move the lens carrier along the optical axis. For example, the actuator may move the lens carrier, along the optical axis, relative to the magnet holder and the image sensor to provide autofocus (AF) movement of an image captured via the image sensor. Additionally, or alternatively, the actuator may move the lens carrier and the magnet holder in at least one direction orthogonal to the optical axis. For example, the actuator may move the lens carrier and the magnet holder, in at least one direction orthogonal to the optical axis, relative to the image sensor to provide optical image stabilization (OIS) movement of the image. In some embodiments, the suspension spring structure may include an AF suspension spring to guide movement of the lens carrier relative to the magnet holder and the image sensor to facilitate the AF movement. Furthermore, in some embodiments, the camera may include an OIS suspension structure to guide movement of the lens carrier and the magnet holder relative to the image sensor to facilitate OIS movement. According to some embodiments, the bumper may engage with the lateral end stop to cushion movement of the suspension platform, in at least one direction orthogonal to the optical axis, before the outer surface portion of the suspension platform reaches the lateral end stop.

In some embodiments, a device (e.g., a mobile device, a multifunction device, a mobile multifunction device, etc.) may include a camera, one or more processors, and/or a memory. The memory may store program instructions that are executable by the one or more processors to control operation of the camera. According to various embodiments, the camera may include a lens group, an image sensor, an actuator, a suspension platform, a stationary structure, and/or a bumper. The lens group may include one or more lens elements that define an optical axis. The image sensor may capture light that passes through the lens group. The actuator may be configured to move the lens group relative to the image sensor.

In some examples, the suspension platform may be coupled to the lens group. For example, the suspension platform may be coupled to the lens group such that the suspension platform and the lens group are moveable together, e.g., in a direction orthogonal to the optical axis. Furthermore, the stationary structure may define a lateral end stop with respect to movement of the suspension platform in the direction orthogonal to the optical axis. According to various embodiments, the bumper may be at least partially disposed between the suspension platform and the lateral end stop (defined by the stationary structure). The bumper may cushion movement of the suspension platform as the suspension platform approaches the lateral end stop.

In some examples, the bumper may be part of a suspension spring structure. The suspension spring structure may be coupled to the suspension platform. In some examples, the suspension spring structure may be used to guide movement of the lens group along the optical axis in a controlled manner. Furthermore, in some examples, the suspension spring structure may extend along a plane that is orthogonal to the optical axis.

In some examples, the suspension platform may include an outer surface portion. Furthermore, the stationary structure may include an inner surface portion that defines the lateral end stop. In some embodiments, the bumper may be at least partially disposed between the outer surface portion of the suspension platform and the lateral end stop defined by the inner surface portion of the stationary structure.

In some examples, the bumper may include a first protrusion and/or a second protrusion. For example, the first protrusion may have a first end portion disposed between the suspension platform and the lateral end stop. The first end portion may extend in a first direction. The second protrusion may have a second end portion disposed between the suspension platform and the lateral end stop. The second end portion may extend in a second direction that is opposite the first direction. Furthermore, the second end portion of the second protrusion may be spaced apart from the first end portion of the first protrusion by a gap.

In some embodiments, the bumper may be configured to interface with the lateral end stop when movement of the bumper (e.g., in a direction orthogonal to the optical axis) satisfies a threshold distance. According to some examples, the bumper may be configured to deflect in at least one direction that is opposite the direction orthogonal to the optical axis, e.g., as the bumper interfaces with the lateral end stop and approaches the lateral end stop. In some embodiments, the bumper may at least partially extend between the suspension platform and the stationary structure to enforce a clearance between the suspension platform and the stationary structure, so as to limit an amount of electrostatic charge accumulation on the suspension platform and/or the stationary structure.

In some examples, the camera may include a lens carrier to which the lens group is fixedly attached. The actuator may include a coil and a magnet. The suspension platform may include a magnet holder to which the magnet is attached. Furthermore, in some examples, the suspension spring structure may couple the lens carrier with the magnet holder such that the lens carrier is moveable (e.g., along the optical axis) relative to the magnet holder.

In some examples, the stationary structure may include a shield can. The bumper may be a first bumper proximate a first side of the shield can. Furthermore, the device may include one or more additional bumpers. As an example, the device may include a second bumper, a third bumper, and/or a fourth bumper. The second bumper may be located proximate a second side of the shield can that is opposite the first side of the shield can. The third bumper may be located proximate a third side of the shield can. The fourth bumper may be located proximate a fourth side of the shield can that is opposite the third side of the shield can.

In some examples, the processor(s) may perform operations to enable various functionality of the camera, e.g., based on program instructions stored in the memory and executable by the processor(s). For instance, the processor(s) may cause the display to present (e.g., on a display of the device) an image captured via the image sensor. In some examples, the processor(s) may cause the actuator to move the lens carrier, along the optical axis, relative to the magnet holder and the image sensor, e.g., to provide AF movement of an image captured via the image sensor. Additionally, or alternatively, the processor(s) may cause the actuator to move the lens carrier and the magnet holder, in at least a direction orthogonal to the optical axis, relative to the image sensor, e.g., to provide OIS movement of an image captured via the image sensor.

In some embodiments, an optics suspension system (e.g., for a camera) may include a suspension platform and/or a bumper. The suspension platform may be coupled to the lens group. The lens group may include one or more lens elements that define an optical axis. The suspension platform and the lens group may be coupled with one another such that the suspension platform and the lens group are moveable together, e.g., in a direction orthogonal to the optical axis. An actuator of the camera may be used to move the lens group relative to an image sensor of the camera. In various embodiments, the bumper may be at least partially disposed between the suspension platform and a lateral end stop with respect to movement of the suspension platform in the direction orthogonal to the optical axis. The lateral end stop may be defined by a stationary structure of the camera. The bumper may be configured to cushion movement of the suspension platform as the suspension platform approaches the lateral end stop.

According to some examples, the actuator may comprise a VCM actuator that includes a magnet and a coil. Furthermore, the suspension platform may include a magnet holder to which the magnet is attached. In various embodiments, the bumper may be part of a suspension spring structure that couples the magnet holder with a lens carrier to which the lens group is attached, such that the lens carrier is moveable (e.g., along the optical axis) relative to the magnet holder. In some embodiments, the stationary structure may include a shield can that at least partially encompasses the suspension platform. The shield can may be stationary relative to movement of the suspension platform.

In some examples, the suspension platform may have an outer surface of a side of the magnet holder. The outer surface may define a first plane that is parallel to the optical axis. Furthermore, the stationary structure may have an inner surface of a side of the shield can. The inner surface may define a second plane that is parallel to the optical axis. In some embodiments, the bumper may be at least partially disposed between the first plane and the second plane.

According to some embodiments, the suspension spring structure may include a first frame portion, a second frame portion, and/or one or more spring elements. The first frame portion may be attached to the magnet holder. The second frame portion may be attached to the lens carrier. The spring element(s) may extend from the first frame portion to the second frame portion. In some embodiments, the bumper may include a first protrusion and/or a second protrusion that extend from the first frame portion. The first protrusion may have a first end portion that extends in a first direction. The second protrusion may have a second end portion that extends in a second direction that is opposite the first direction. Furthermore, the second end portion may be spaced apart from the first end portion by a gap in some embodiments. In some non-limiting examples, the bumper and/or the suspension spring structure may be formed of metal (e.g., sheet metal).

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 illustrates a side cross-sectional view of an example camera 100 having a suspension spring structure with an end stop bumper, in accordance with some embodiments. In some embodiments, the camera 100 may include one or multiple features, components, and/or functionality of embodiments described herein with reference to FIGS. 2-10.

In various embodiments, the camera 100 may include a lens group 102, an image sensor 106, an actuator 108, a suspension platform 110, a stationary structure 112, and/or a suspension spring structure 114. The lens group 102 may include one or more lens elements that define an optical axis 116. The image sensor 106 may capture light that passes through the lens group 102. The actuator 108 may be configured to move the lens group 102 relative to the image sensor 106.

According to some examples, the suspension platform 110 may be coupled to the lens group 102. For instance, the suspension platform 110 may be coupled to the lens group 102 such that the suspension platform 110 moves together with the lens group 102, e.g., when the actuator 108 moves the lens group 102 relative to the image sensor 106. In some examples, the suspension platform 110 may be coupled to the lens group 102 such that the suspension platform 110 and the lens group 102 are moveable together in a direction orthogonal to the optical axis 116. In some embodiments, the suspension platform 110 may include an outer surface portion 118. Furthermore, the stationary structure 112 may include an inner surface portion 120. In some examples, the outer surface portion 118 and the inner surface portion 120 may face each other, e.g., as indicated in FIG. 1. According to various embodiments, the inner surface portion 120 of the stationary structure 112 may define a lateral end stop 120 with respect to movement of the suspension platform 110 in one or more directions. As a non-limiting example, the inner surface portion 120 of the stationary structure 112 may define a lateral end stop 120 that stops the outer surface portion 118 of the suspension platform 110 from moving in a direction orthogonal to the optical axis 116 (e.g., movement resulting from impact in a drop event) beyond the inner surface portion 120 of the suspension platform 110.

In some examples, the suspension spring structure 114 may be coupled to the suspension platform 110. Furthermore, the suspension spring structure 114 may extend along a plane that is orthogonal to the optical axis 116 in some examples. The suspension spring structure 114 may be used to guide movement of the lens 102 along the optical axis 116 in a controlled manner. According to various embodiments, the suspension spring structure 114 may include an end stop bumper 122 (also referred to herein as a "bumper") that is at least partially disposed between the outer surface portion 118 of the suspension platform 110 and the lateral end stop 120 (defined by the inner surface portion 120 of the stationary structure 112). The bumper 122 may be configured to cushion movement of the suspension platform 110 before the outer surface portion 118 of the suspension platform 110 reaches the lateral end stop 120. Additionally, or alternatively, the bumper 122 may be configured to cushion movement of the suspension platform 110 as the suspension platform 110 approaches the lateral end stop 120.

In some examples, the actuator 108 may be a voice coil motor (VCM) actuator that includes one or more coils and one or more magnets. According to some embodiments, one or more coils (e.g., of the actuator 108), one or magnets (e.g., of the actuator), and/or one or more other components of the camera 100 may be attached to the suspension platform 110. In some embodiments, the actuator 108 may include magnet(s) 124 and autofocus coil(s) 126 that are configured to magnetically interact to move the lens group 102 along the optical axis 116, e.g., to provide AF movement of an image captured via the image sensor 106. Additionally, or alternatively, the actuator 108 may include magnet(s) 124 and optical image stabilization (OIS) coils 128 that are configured to magnetically interact to move the lens group 102 in one or more directions orthogonal to the optical axis 116, e.g., to provide OIS movement of an image captured via the image sensor 106.

Figure 2:
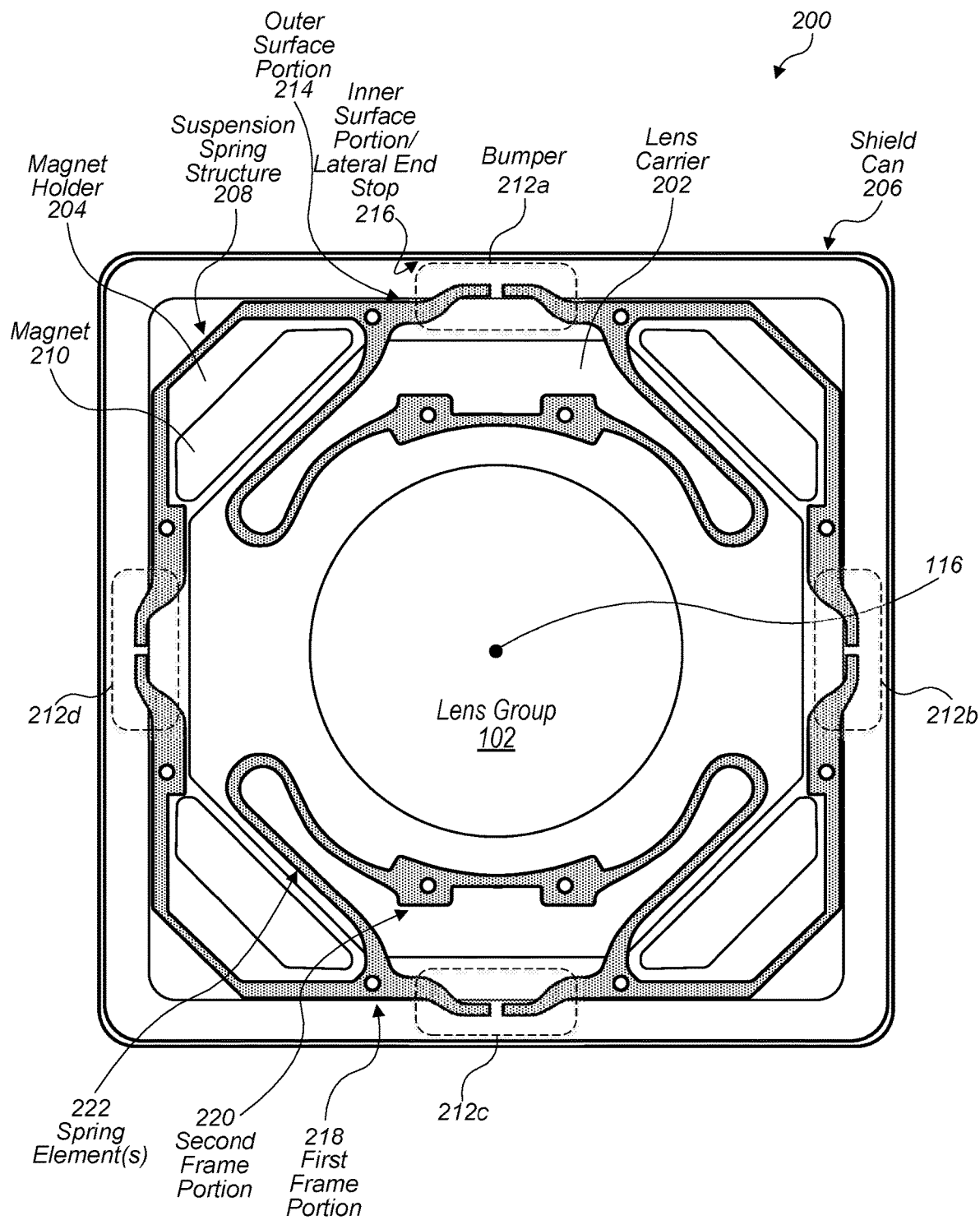
FIG. 2 illustrates a top cross-sectional view of an example camera having a suspension spring structure with one or more end stop bumpers, in accordance with some embodiments.

In some embodiments, the camera may include a lens carrier 130. Furthermore, the suspension platform 110 may include a magnet holder 132. The stationary structure 112 may include a shield can 134. The lens carrier 130 may be configured to hold or otherwise support the lens group 102. In some examples, the lens group 102 may be fixedly attached to the lens carrier 130. The magnet holder 132 may be configured to hold or otherwise support magnet(s) 124. The shield can 134 may be configured to at least partially encompass the suspension platform 110 (e.g., the lens carrier 130 and/or the magnet holder 132). The shield can 134 may be stationary relative to movement of the suspension platform 110. In various embodiments, the suspension spring structure 114 may be configured to couple the lens carrier 130 with the magnet holder 132, e.g., as indicated in FIGS. 1 and 2. In some examples, the suspension spring structure 114 may couple the lens carrier 130 with the magnet holder 132 such that the lens carrier 130 is moveable (e.g., along the optical axis 116) relative to the magnet holder 132.

In some examples, the actuator 108 may move the lens carrier 130 along the optical axis 116. For example, the actuator 108 may move the lens carrier 130, along the optical axis 116, relative to the magnet holder 132 and the image sensor 106 to provide AF movement of an image captured via the image sensor 106. Additionally, or alternatively, the actuator 108 may move the lens carrier 130 and the magnet holder 132 one or more directions orthogonal to the optical axis 116. For example, the actuator 108 may move the lens carrier 130 and the magnet holder 132, in at least one direction orthogonal to the optical axis 116, relative to the image sensor 106 to provide OIS movement of an image captured via the image sensor 106. In some embodiments, the suspension spring structure 114 may include an AF suspension spring configured to guide movement of the lens carrier 130 relative to the magnet holder 132 and the image sensor 106 to facilitate the AF movement. Furthermore, in some embodiments, the camera 100 may include an OIS suspension structure 136 configured to guide movement of the lens carrier 130 and the magnet holder 132 relative to the image sensor 106 to facilitate OIS movement. In some embodiments, the OIS suspension structure 136 may include one or more suspension wires, e.g., as indicated in FIG. 1.

In some embodiments, the bumper 122 may make contact with the lateral end stop 120 as the magnet holder 132 moves towards the shield can 134, and the bumper 122 may increasingly deflect (e.g., in one or more directions orthogonal to the optical axis 116 and/or away from the shield can 134) as the magnet holder 132 increasingly approaches the shield can 134. According to various embodiments, the bumper 122 may be configured so as to maximize its stiffness in the direction(s) of deflection. Furthermore, the bumper 122 may be configured so as to minimize stress levels imposed on the bumper 122 and/or the suspension spring 114, thereby increasing reliability.

In some embodiments, the bumper 122 may enforce an amount of clearance between the magnet holder 132 and the shield can 134. Without such clearance, the magnet holder 132 and the shield can 134 may be sufficiently close to one another that movement of the magnet holder 132 relative to the shield can 134 may cause an undesirable accumulation of electrostatic charge on the magnet holder 132 and/or the shield can 134. The accumulation of electrostatic charge may interfere with operation of the actuator 108 and/or control of the actuator 108.

In some embodiments, the camera 100 may include a substrate 138 that holds or otherwise supports the image sensor 106. Furthermore, in some examples, the substrate 138 may hold or otherwise support the OIS coil(s) 128. For example, an OIS coil 128 may be disposed on the substrate and below a magnet 124 held by the magnet holder 132. It should be understood that the actuator 108 may have various other configurations suitable for a camera having a suspension spring with an end stop bumper, in accordance with embodiments described herein.

Although the bumper 122 is described in various embodiments as being part of the suspension spring structure 114, the bumper 122 may not be part of the suspension spring structure 114 in some embodiments. In some examples, the bumper 122 may be a component that is attached to the suspension spring structure 114, the suspension platform 110 (e.g., magnet holder 132), and/or the stationary structure (e.g., the shield can 134).

FIG. 2 illustrates a top cross-sectional view of an example camera 200 having a suspension spring structure with one or more end stop bumpers, in accordance with some embodiments. In some embodiments, the camera 200 may include one or multiple features, components, and/or functionality of embodiments described herein with reference to FIGS. 1 and 3-10.

In some examples, the camera 200 may include a lens carrier 202, a magnet holder 204, a shield can 206, and/or a suspension spring structure 208. The lens carrier 202 may hold or otherwise support the lens group 102. The magnet holder 204 may hold or otherwise support one or more magnets 210 (e.g., magnet(s) of an actuator, such as the actuator 108 described herein with reference to FIG. 1). In various embodiments, the shield can 206 may be configured to at least partially encompass one or more components of the camera 200. For example, the shield can 206 may at least partially encompass the lens carrier 202 and/or the magnet holder 204.

According to various embodiments, the suspension spring structure 208 may include one or more bumpers 212 (e.g., bumper(s) 212a, 212b, 212c, and/or 212d). For example, a first bumper 212a may include one or more protrusions (e.g., protrusions 308 and/or 310 in FIG. 3). In some embodiments, at least a portion of the protrusion(s) may be located between the lens carrier 202 and the magnet holder 204. For example, the magnet holder 204 may have an outer surface portion 214. The protrusion(s) may extend (e.g., in one or more directions orthogonal to the optical axis 116) from the first portion of the suspension spring 208 towards the shield can 206, such that at least a portion of the protrusion(s) is disposed beyond the outer surface portion 214 of the magnet holder 204, e.g., extending away from the optical axis 116 as indicated in FIG. 2. In some examples, the shield can 206 may have an inner surface portion 216. The inner surface portion 216 may define a lateral end stop 216 with respect to movement of the magnet holder 204 (e.g., movement in one or more directions orthogonal to the optical axis 116). In various embodiments, the protrusion(s) may extend from the first portion of the suspension spring 208 towards the shield can 206, such that at least a portion of the protrusion(s) is disposed between the outer surface portion 214 of the magnet holder 204 and the lateral end stop 216. In some embodiments, the inner surface portion 216 of the shield can 206 may not be flat. For example, the inner surface portion 216 of the shield can 206 may be curved or otherwise shaped, and may extend toward and be positioned in the path of the first bumper 212a. Additionally, or alternatively, there may be one or more additional extensions (e.g., a dimple, an additional layer, etc.) that extends toward and is positioned in the path of the first bumper 212a.

In various embodiments, the first bumper 212a may engage with the lateral end stop 216 under certain circumstances (e.g., a drop event that causes the magnet holder 204 to move towards the shield can 206). Furthermore, the first bumper 212a may cushion movement of the magnet holder 204 (e.g., movement in one or more directions orthogonal to the optical axis 116), so as to prevent an impact (or otherwise mitigate the effects of an impact) between the magnet holder 204 and the shield can 206. As a non-limiting example, the first bumper 212a may make contact with the lateral end stop 216 as the magnet holder 204 moves towards the shield can 206, and the first bumper 212a may increasingly deflect (e.g., in one or more directions orthogonal to the optical axis 116 and/or away from the shield can 206) as the magnet holder 204 increasingly approaches the shield can 206. According to various embodiments, the first bumper 212a may be configured so as to maximize its stiffness in the direction(s) of deflection. In some examples, the first bumper 212a may be designed (e.g., material selection, geometry, etc.) to satisfy a threshold stiffness requirement. The threshold stiffness may be determined, e.g., based at least in part on one or more design parameters and/or constraints for the camera 200. Furthermore, the first bumper 212a may be configured so as to minimize stress levels imposed on the first bumper 212a and/or the suspension spring 208, thereby increasing reliability. In some examples, the first bumper 212a may be designed (e.g., material selection, geometry, etc.) to satisfy a threshold stress level requirement. The threshold stress level may be determined, e.g., based at least in part on one or more design parameters and/or constraints for the camera 200.

According to some embodiments, the first bumper 212a may be part of the suspension spring structure 208. In some examples, the first bumper 212a may be integrally formed with the suspension spring structure 208. For example, the suspension spring structure 208 (including the first bumper 212a) may be formed of a same material. (e.g., a same sheet of metal). In some embodiments, the first bumper 212a and the suspension spring structure 208 may be formed of different materials. The first bumper 212a may be attached to the suspension spring structure 208, the magnet holder 204, and/or the shield can 206 in various embodiments. According to some examples, the first bumper 212a may be partially formed of a first material (e.g., metal), and a second material (e.g., a polymer) may be attached to one or more surfaces of the first bumper 212a to form one or more contact surfaces that are configured to contact the lateral end stop 216.

In some embodiments, the first bumper 212a and the suspension spring structure 208 may have a same thickness dimension (e.g., a dimension extending in a direction parallel to the optical axis 116). In other embodiments, at least a portion of the first bumper 212a may have a different thickness dimension than one or more portions of the suspension spring structure 208. In some examples, the first bumper 212a may have a uniform thickness dimension. In other examples, a first portion of the first bumper 212a may have a first thickness dimension, and a second portion of the first bumper 212a may have a second thickness dimension that is different than the first thickness dimension.

According to some embodiments, the suspension spring structure 208 may include a first frame portion 218, a second frame portion 220, and/or one or more spring elements 222. The first frame portion 218 may be attached to the magnet holder 204. The second frame portion 220 may be attached to the lens carrier 202. The spring element(s) 222 may extend from the first frame portion 218 to the second frame portion 220. In this manner, the suspension spring structure 208 may couple the lens carrier 202 with the magnet holder 204. In some embodiments, the first frame portion 218 may be attached to a top portion of the magnet holder 204 (e.g., an uppermost surface of the magnet holder 204), and the second frame portion of the suspension spring structure 208 may be attached to a top portion of the lens carrier 202 (e.g., an uppermost surface of the lens carrier 202). In some embodiments, the suspension spring structure 208 may be attached to a bottom portion of the magnet holder 204 (e.g., a lowermost surface of the magnet holder 204) and to a bottom portion of the lens carrier 202 (e.g., a lowermost surface of the lens carrier 202). In some embodiments, the camera 200 may include a top suspension spring structure 208 attached to respective top portions of the magnet holder 204 and the lens carrier 202, and a bottom suspension spring structure 208 attached to respective bottom portions of the magnet holder 204 and the lens carrier 202. The top suspension spring structure 208 and/or the bottom suspension spring structure 208 may include one or more bumpers 212. For example, the top suspension spring structure 208 and the bottom suspension spring structure 208 may have bumper(s) 212 that are in the same position(s) around the periphery of the magnet holder 204. In some embodiments, the top suspension spring structure 208 and the bottom suspension spring structure 208 may have bumper(s) 212 that are in different position(s) around the periphery of the magnet holder 204. In some examples, the bumper(s) 212 of the top suspension spring structure 208 and the bumper(s) 212 of the bottom suspension spring structure 208 may have the same relative extension so that there would be simultaneous contact with the lateral end stop(s) 120, e.g., assuming the lateral end stop(s) are flat and the movement is lateral. In some examples, the bumper(s) 212 of the top suspension spring structure 208 and the bumpers(s) 212 of the bottom suspension spring structure 208 may have differing amounts of extension so that the bumper(s) 212 of one suspension spring structure 208 would contact with the lateral end stop(s) 120 before the other suspension spring structure 208. According to some embodiments, the suspension spring structure 208 may be an autofocus (AF) suspension spring structure in various embodiments.

In some embodiments, the first bumper 212a may include a first protrusion (e.g., first protrusion 308 in FIG. 3A) and/or a second protrusion (e.g., second protrusion 310 in FIG. 3A). The first protrusion and the second protrusion may extend from the first frame portion 218. The first protrusion may have a first end portion (e.g., first end portion 312 in FIG. 3A) that extends in a first direction (e.g., first direction 314 in FIG. 3A). The second protrusion may have a second end portion (e.g., second end portion 316 in FIG. 3A) that extends in a second direction (e.g., second direction 318 in FIG. 3A) that is opposite the first direction. In some embodiments, the second end portion may be spaced apart from the first end portion by a gap (e.g., gap 320 in FIG. 3A).

In some examples, the suspension spring structure 208 may include the first bumper 212a, a second bumper 212b, a third bumper 212c, and/or a fourth bumper 212d, e.g., as indicated in FIG. 2. The first bumper 212a may be located proximate a first side of the shield can 206. The second bumper 212b may be located proximate a second side of the shield can 206. In some examples, the first side of the shield can 206 and the second side of the shield can 208 may extend orthogonal to one another. The third bumper 212c may be located proximate a third side of the shield can 206 that is opposite the first side of the shield can 206. In some examples, the first side of the shield can 206 and the third side of the shield can 206 may extend parallel to one another. The fourth bumper 212d may be located proximate a fourth side of the shield can 206 that is opposite the second side of the shield can 206. In some examples, the first side of the shield can 206 and the fourth side of the shield can 206 may extend orthogonal to one another. In various embodiments, the first side, second side, third side, and/or fourth side of the shield can 206 may circumferentially surround, at least in part, the magnet holder 204.

In some embodiments, the first bumper 212a, the second bumper 212b, the third bumper 212c, and the fourth bumper 212d may have the same geometry, e.g., as indicated in FIG. 2. It should be understood, however, that the bumpers 212 may vary in geometry and location in some embodiments. For example, the first bumper 212a and the second bumper 212b may have respective geometries that are different from one another. As another example, the first bumper 212a may be located proximate a middle portion of the first side of the shield can 206, and the second bumper 212b may be located proximate an end portion (e.g., not in the middle portion) of the second side of the shield can 206. While the example suspension spring structure 208 in FIG. 2 includes four bumpers (212a, 212b, 212c, and 212d), other embodiments may include fewer or more bumpers.

FIGS. 3A and 3B each illustrates a respective schematic top view of an example end stop bumper and a lateral end stop of a camera, in accordance with some embodiments. FIG. 3A illustrates an example in which the end stop bumper is not in contact with the lateral end stop. FIG. 3B illustrates an example in which the end stop bumper is in contact with the lateral end stop bumper. In some embodiments, example 300a and/or example 300b may include one or multiple features, components, and/or functionality of embodiments described herein with reference to FIGS. 1, 2, and 4-10.

In some embodiments, the example 300a may include a bumper 302 and a stationary structure 304. The stationary structure 304 may define a lateral end stop 306 with respect to movement of a suspension platform (e.g., suspension platform 110 and/or magnet holder 132 in FIG. 1, magnet holder 204 in FIG. 2, etc.). In some embodiments, the lateral end stop 306 may be a hard stop with respect to movement of the suspension platform in one or more directions orthogonal to an optical axis (e.g., optical axis 116 in FIGS. 1 and 2) defined by a lens group (e.g., lens group 102 in FIGS. 1 and 2). In the example 300a, the bumper 302 is not in contact with the lateral end stop 306. In some embodiments, the example 300a may indicate a position of the bumper 302 when a camera that includes the bumper 302 is in a state of rest. Additionally, or alternatively, the example 300a may indicate a position of the bumper 302 when the suspension platform is within its normal functional range of travel (e.g., when the bumper 302 is to interface with the lateral end stop 306 under conditions in which the suspension platform exceeds its normal function range of travel, such as a drop event). In various embodiments, the bumper 302 may not be deflected when the bumper 302 is not in contact with (and/or is not approaching) the lateral end stop 306, as indicated in FIG. 3A.

According to some embodiments, the bumper 302 may include a first protrusion 308 and/or a second protrusion 310. The first protrusion 308 may have a first end portion 312 that extends in a first direction 314. The second protrusion 310 may have a second end portion 316 that extends in a second direction 318. The second direction 318 may be opposite the first direction 314. In some embodiments, the second end portion 316 may be spaced apart from the first end portion 312 by a gap 320. The gap 320 may allow for the first protrusion 308 and the second protrusion 310 to deflect in such a manner that reduces stresses imposed on the bumper 302, thereby increasing reliability.

In some non-limiting embodiments, the first protrusion 308 and the second protrusion 310 may mirror each other such that the bumper 302 is symmetrical about an axis (e.g., axis 322) that is orthogonal to an optical axis (e.g., optical axis 116 in FIGS. 1 and 2). As indicated in FIG. 3, the first protrusion 308 and/or the second protrusion 310 may have a variable cross-section. For example, as indicated in FIG. 3, a first portion of the first protrusion 308 may have a first cross-section that is greater than a second cross-section of a second portion of the first protrusion 308. In some embodiments, one or more portions of the first protrusion 308 may a tapered cross-section. Furthermore, one or more portions of the first protrusion 308 may have uniform cross-section.

In the example 300b, the bumper 302 may be in contact with the lateral end stop 306. The bumper 302 may move in a first direction 324 as it increasingly approaches the lateral end stop 306 and/or increasingly pushes against the lateral end stop 306 after making contact with the lateral end stop. Reaction forces acting on the bumper 302 (e.g., forces resulting from the bumper 302 pushing against the lateral end stop 306 as the bumper 302 moves in the first direction 324) may cause the bumper 302 to deflect in one or more directions. For example, the bumper 302 may deflect in at least a second direction 326 that is opposite the first direction 324. In some embodiments, the example 300b may indicate a position of the bumper 302 when the camera that includes the bumper 302 is not in a state of rest. Additionally, or alternatively, the example 300b may indicate a position of the bumper 302 when the suspension platform exceeds its normal functional range of travel.

Figure 4:
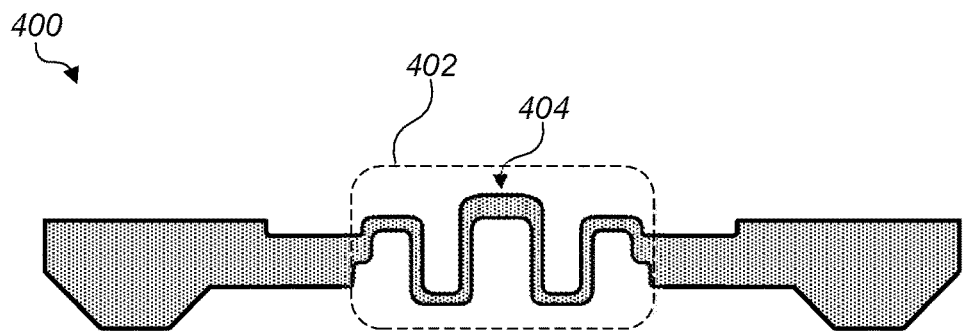
FIG. 4 illustrates a top view of an example suspension spring structure that includes an example end stop bumper, in accordance with some embodiments.

FIG. 4 illustrates a top view of another example suspension spring structure 400 that includes an example end stop bumper, in accordance with some embodiments. In some embodiments, the suspension spring structure 400 may include one or multiple features, components, and/or functionality of embodiments described herein with reference to FIGS. 1-3B and 5-10.

In some embodiments, the suspension spring structure 400 may include a bumper 402. The bumper 402 may include a contact surface 404 to contact a surface of a stationary structure (e.g., stationary structure 112 and/or shield can 134 in FIG. 1, shield can 206 in FIG. 2, etc.). In some embodiments, the contact surface 404 may define a plane that is parallel to an optical axis (e.g., optical axis 116 in FIGS. 1 and 2). Furthermore, a longest dimension of the contact surface 404 may extend along an axis that is orthogonal to the optical axis. Unlike the bumper 212a described in FIGS. 2-3B, the bumper 402 may not include a gap between protrusions in some embodiments. According to some examples, the bumper 402 may be a contiguous flexure with multiple bends, e.g., as indicated in FIG. 4. One or more portions of the bumper 402 may extend in directions orthogonal to the contact surface 404. Furthermore, one or more portions of the bumper 402 may extend in directions parallel to the contact surface 404.

Figure 5:
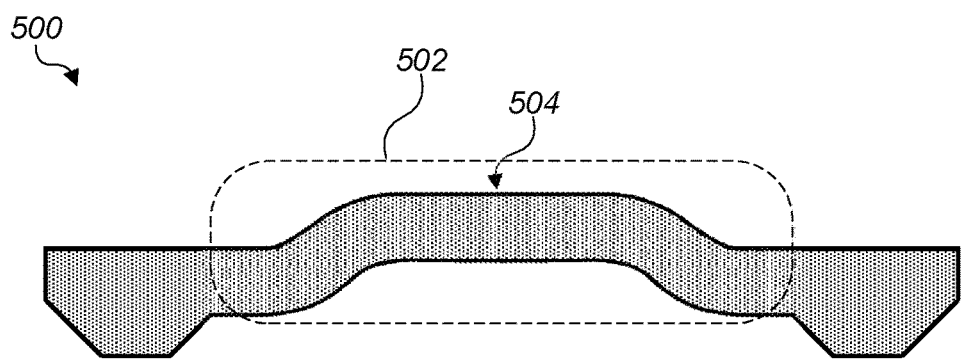
FIG. 5 illustrates a top view of another example suspension spring structure that includes an example end stop bumper, in accordance with some embodiments.

FIG. 5 illustrates a top view of yet another example suspension spring structure 500 that includes an example end stop bumper, in accordance with some embodiments. In some embodiments, the suspension spring structure 500 may include one or multiple features, components, and/or functionality of embodiments described herein with reference to FIGS. 1-4 and 6-10.

In some embodiments, the suspension spring structure 500 may include a bumper 502. The bumper 502 may include a contact surface 404 to contact a surface of a stationary structure (e.g., stationary structure 112 and/or shield can 134 in FIG. 1, shield can 206 in FIG. 2, etc.). In some embodiments, the contact surface 504 may define a plane that is parallel to an optical axis (e.g., optical axis 116 in FIGS. 1 and 2). Furthermore, a longest dimension of the contact surface 504 may extend along an axis that is orthogonal to the optical axis. Unlike the bumper 212a described in FIGS. 2 and 3, the bumper 502 may not include a gap between protrusions in some embodiments. According to some examples, the bumper 502 may be a contiguous component, e.g., as indicated in FIG. 4. The bumper 402 may have one or more bends at opposing end portions of the contact surface 504.

Figure 6:
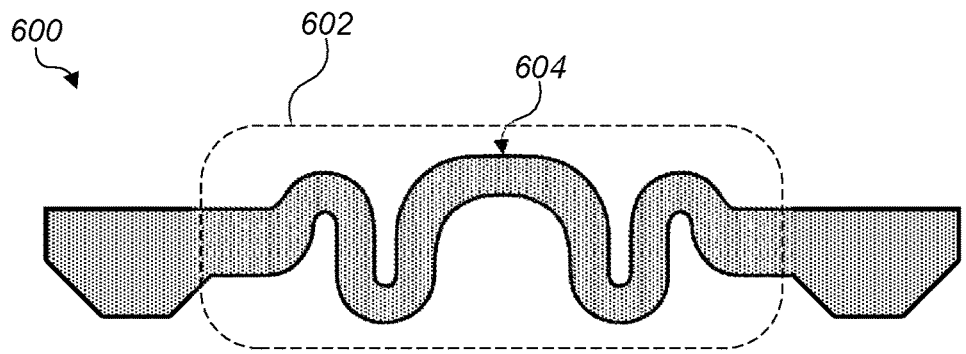
FIG. 6 illustrates a view of yet another example suspension spring structure that includes an example end stop bumper, in accordance with some embodiments.

FIG. 6 illustrates a view of still yet another example suspension spring structure 600 that includes an example end stop bumper, in accordance with some embodiments. In some embodiments, the suspension spring structure 600 may include one or multiple features, components, and/or functionality of embodiments described herein with reference to FIGS. 1-5 and 7-10.

In some embodiments, the suspension spring structure 600 may include a bumper 602. The bumper 602 may include a contact surface 604 to contact a surface of a stationary structure (e.g., stationary structure 112 and/or shield can 134 in FIG. 1, shield can 206 in FIG. 2, etc.). In some embodiments, the contact surface 604 may define a plane that is parallel to an optical axis (e.g., optical axis 116 in FIGS. 1 and 2). Furthermore, a longest dimension of the contact surface 604 may extend along an axis that is orthogonal to the optical axis. Unlike the bumper 212a described in FIGS. 2 and 3, the bumper 602 may not include a gap between protrusions in some embodiments. According to some examples, the bumper 602 may be a contiguous flexure with multiple bends, e.g., as indicated in FIG. 4. In some embodiments, the curvature of the bends of the bumper 602 may be greater than the curvature of the bends of the bumper 402 described herein with reference to FIG. 4. In some embodiments, the cross-section(s) of the bumper 602 may be greater than those of the bumper 402 described herein with reference to FIG. 4. One or more portions of the bumper 602 may extend in directions orthogonal to the contact surface 604. Furthermore, one or more portions of the bumper 602 may extend in directions parallel to the contact surface 404.

Figure 7:
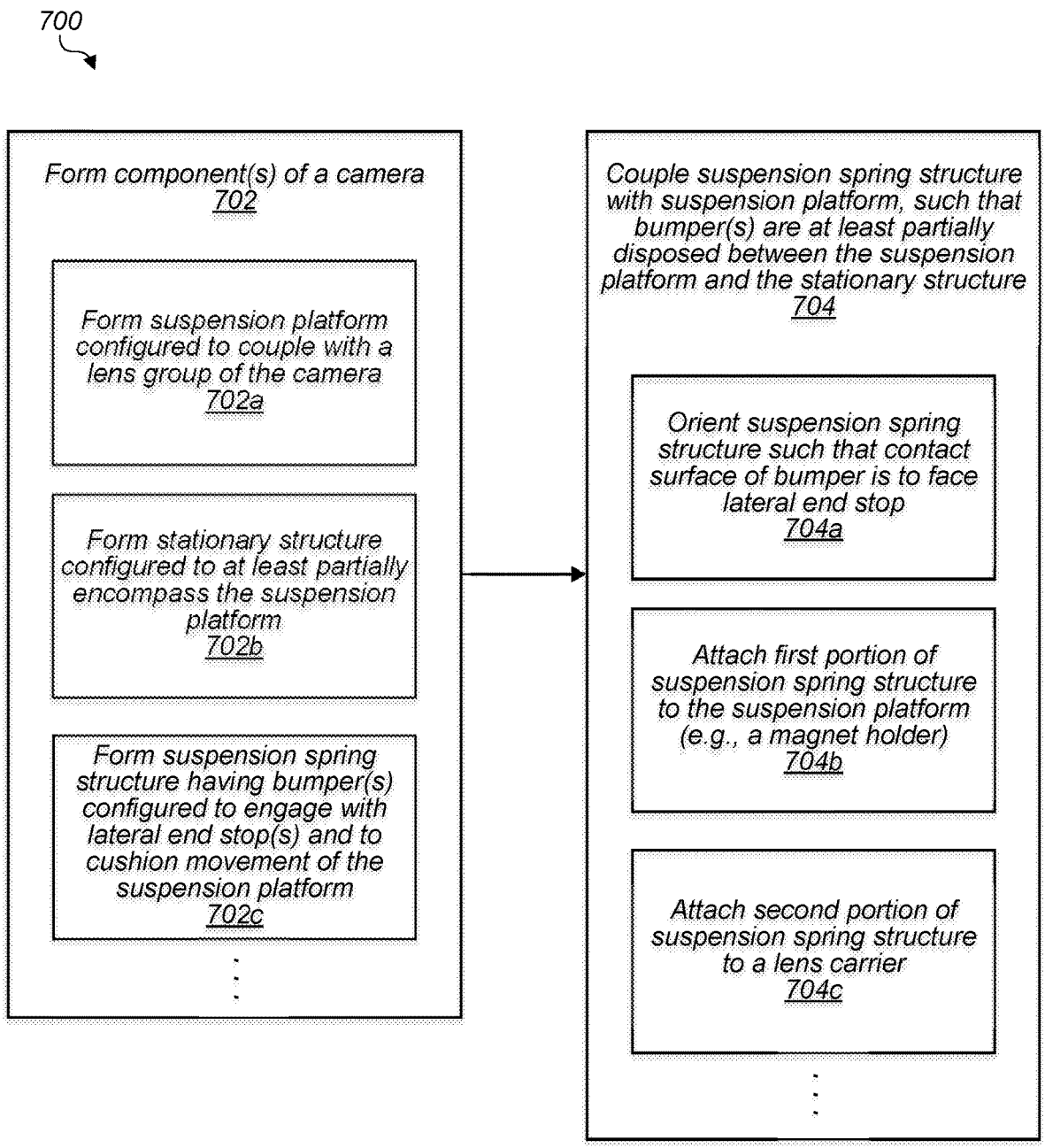
FIG. 7 is a flowchart of an example method of assembling a camera having a suspension spring with an end stop bumper, in accordance with some embodiments.

FIG. 7 is a flowchart of an example method 700 of constructing a camera having a suspension spring structure with an end stop bumper, in accordance with some embodiments. In some embodiments, the method 700 may include one or multiple features, components, and/or functionality of embodiments described herein with reference to FIGS. 1-6 and 8-10.

At 702, the method 700 may include forming one or more components of a camera. For example, at 702(a), the method 700 may include forming a suspension platform. In various embodiments, the suspension platform may be configured to couple with a lens group of the camera. At 702(b), the method 700 may include forming a stationary structure. In various embodiments, the stationary structure may be configured to at least partially encompass the suspension platform. At 702(c), the method 700 may include forming a suspension spring structure. The suspension spring may have one or more bumpers configured to engage with one or more lateral end stops of the camera, e.g., as described herein with reference to FIGS. 1-6. Furthermore, the bumper(s) may be configured to cushion movement of the suspension platform, e.g., movement in one or more directions orthogonal to an optical axis defined by the lens group. In some embodiments, the suspension spring structure and/or the bumper(s) may be formed of sheet metal. For example, the suspension spring structure and/or the bumper(s) may be formed by etching the sheet metal. In some embodiments, the suspension spring structure may include a first frame portion, a second frame portion, and one or more spring elements, e.g., as described herein with reference to FIG. 2.

At 704, the method 700 may include coupling the suspension spring structure with the suspension platform. For example, the suspension spring structure may be coupled with the suspension platform such that the bumper(s) are at least partially disposed between the suspension platform and the stationary structure. At 704(a), the method 700 may include orienting the suspension spring structure such that a contact surface of a bumper is oriented to face a lateral end stop. At 704(b), the method 700 may include attaching a first portion of the suspension spring structure to a first portion of the suspension platform. For example, the suspension platform may include a magnet holder, and the first frame portion of the suspension spring structure may be attached to the magnet holder. At 704(c), the method 700 may include attaching a second portion of the suspension spring structure to a lens carrier of the camera.

Figure 8:
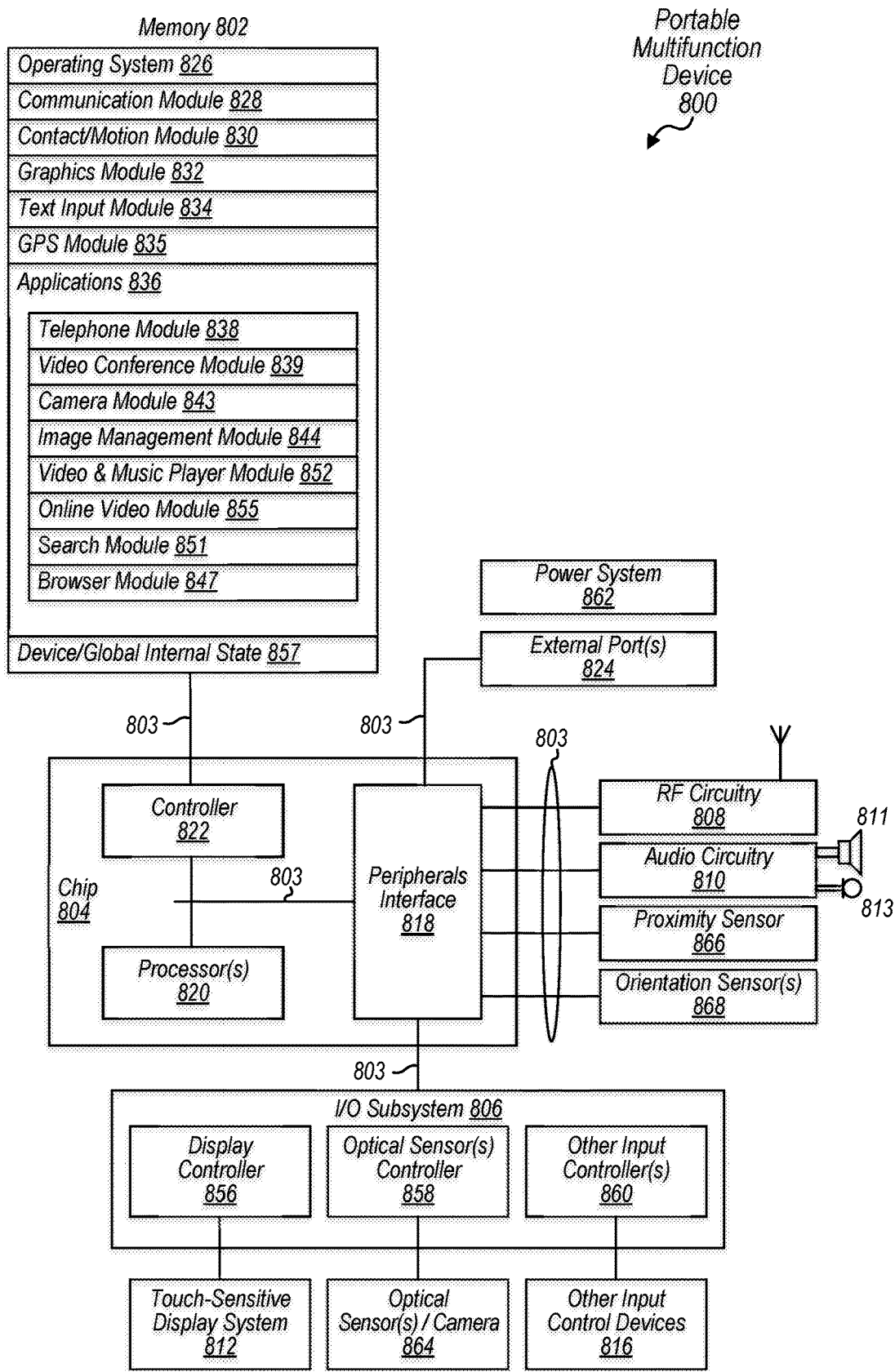
FIG. 8 illustrates a block diagram of a portable multifunction device that may include a camera having a suspension spring structure and/or one or more end stop bumpers, in accordance with some embodiments.

FIG. 8 illustrates a block diagram of a portable multifunction device 800 that may include a camera having a suspension spring structure and/or an end stop bumper, in accordance with some embodiments. In some embodiments, the device 800 may include one or multiple features, components, and/or functionality of embodiments described herein with reference to FIGS. 1-7, 9, and 10.

In some embodiments, the device 800 is a portable communications device, such as a mobile telephone, that also contains other functions, such as PDA, camera, video capture and/or playback, and/or music player functions. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device 800 typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device 800 may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 800 may include memory 802 (which may include one or more computer readable storage mediums), memory controller 822, one or more processing units (CPU's) 820, peripherals interface 818, RF circuitry 808, audio circuitry 810, speaker 811, touch-sensitive display system 812, microphone 813, input/output (I/O) subsystem 806, other input control devices 816, and external port 824. Device 800 may include one or more optical sensors or cameras 864 (e.g., one or more embodiments of the cameras described herein). These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8 may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 811, and microphone 813 provide an audio interface between a user and device 800. Audio circuitry 810 receives audio data from peripherals interface 818, converts the audio data to an electrical signal, and transmits the electrical signal to speaker 811. Speaker 811 converts the electrical signal to audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 802 and/or RF circuitry 808 by peripherals interface 818. In some embodiments, audio circuitry 810 also includes a headset jack. The headset jack provides an interface between audio circuitry 810 and removable audio input/output peripherals, such as output-only headphones or a headset with both output (e.g., a headphone for one or both ears) and input (e.g., a microphone).

I/O subsystem 806 couples input/output peripherals on device 800, such as touch screen 812 and other input control devices 816, to peripherals interface 818. I/O subsystem 806 may include display controller 856 and one or more input controllers 860 for other input control devices 816. The one or more input controllers 860 receive/send electrical signals from/to other input control devices 816. The other input control devices 816 may include physical buttons (e.g., push buttons, rocker buttons, etc.), dials, slider switches, joysticks, click wheels, and so forth. In some alternative embodiments, input controller(s) 860 may be coupled to any (or none) of the following: a keyboard, infrared port, USB port, and a pointer device such as a mouse. The one or more buttons may include an up/down button for volume control of speaker 811 and/or microphone 813. The one or more buttons may include a push button.

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 has a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an example embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an example embodiment, projected mutual capacitance sensing technology is used.

Touch screen 812 may have a video resolution in excess of 100 dpi. In some embodiments, the touch screen has a video resolution of approximately 160 dpi. The user may make contact with touch screen 812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 812, device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 812 or an extension of the touch-sensitive surface formed by the touch screen.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors or cameras 864. FIG. 8 shows an optical sensor coupled to optical sensor controller 858 in I/O subsystem 806. Optical sensor 864 may, for example, include charge-coupled device (CCD) or complementary metal-oxide semiconductor (CMOS) phototransistors or photosensors. Optical sensor 864 receives light from the environment, projected through a lens group (e.g., a lens group that includes one or more lenses), and converts the light to data representing an image. In conjunction with imaging module 843 (also called a camera module), optical sensor 864 may capture still images and/or video sequences. In some embodiments, at least one optical sensor may be located on the back of device 800, opposite touch screen display 812 on the front of the device. In some embodiments, the touch screen display may be used as a viewfinder for still and/or video image acquisition. In some embodiments, at least one optical sensor may instead or also be located on the front of the device.

Device 800 may also include one or more proximity sensors 866. FIG. 8 shows proximity sensor 866 coupled to peripherals interface 818. Alternatively, proximity sensor 866 may be coupled to input controller 860 in I/O subsystem 806. In some embodiments, the proximity sensor turns off and disables touch screen 812 when the multifunction device is placed near the user's ear (e.g., when the user is making a phone call).

Device 800 may also include one or more orientation sensors 868. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors include any combination of orientation/rotation sensors. FIG. 8 shows the one or more orientation sensors 868 coupled to peripherals interface 818. Alternatively, the one or more orientation sensors 868 may be coupled to an input controller 860 in I/O subsystem 806. In some embodiments, information is displayed on the touch screen display in a portrait view or a landscape view based on an analysis of data received from the one or more orientation sensors.

In some embodiments, device 800 may also include one or more other sensors (not shown) including but not limited to ambient light sensors and motion detectors. These sensors may be coupled to peripherals interface 818 or, alternatively, may be coupled to an input controller 860 in I/O subsystem 806. For example, in some embodiments, device 800 may include at least one forward-facing (away from the user) and at least one backward-facing (towards the user) light sensors that may be used to collect ambient lighting metrics from the environment of the device 800 for use in video and image capture, processing, and display applications.

In some embodiments, the software components stored in memory 802 include operating system 826, communication module 828, contact/motion module (or set of instructions) 830, graphics module 832, text input module 834, Global Positioning System (GPS) module 835, and applications 836. Furthermore, in some embodiments memory 802 stores device/global internal state 857. Device/global internal state 857 includes one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 808 and/or external port 824. External port 824 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 830 may detect contact with touch screen 812 (in conjunction with display controller 856) and other touch sensitive devices (e.g., a touchpad or physical click wheel). Contact/motion module 830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, contact/motion module 830 and display controller 856 detect contact on a touchpad.

Contact/motion module 830 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 832 includes various software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 832 stores data representing graphics to be used. Each graphic may be assigned a corresponding code. Graphics module 832 receives, from applications etc., one or more codes specifying graphics to be displayed along with, if necessary, coordinate data and other graphic property data, and then generates screen image data to output to display controller 856.

Text input module 834, which may be a component of graphics module 832, provides soft keyboards for entering text in various applications that need text input.

GPS module 835 determines the location of the device and provides this information for use in various applications (e.g., to telephone module 838 for use in location-based dialing, to camera module 843 as picture/video metadata, and to applications that provide location-based services such as map/navigation applications).

Applications 836 may include one or more of, but are not limited to, the following modules (or sets of instructions), or a subset or superset thereof: telephone module 838; video conferencing module 839; camera module 843 for still and/or video imaging; image management module 844; browser module 847; search module 851; video and music player module 852, which may be made up of a video player module and a music player module; online video module 855; and/or one or more other modules not shown, such as a gaming module.

Examples of other applications 836 that may be stored in memory 802 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 808, audio circuitry 810, speaker 811, microphone 813, touch screen 812, display controller 856, contact module 830, graphics module 832, and text input module 834, telephone module 838 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 808, audio circuitry 810, speaker 811, microphone 813, touch screen 812, display controller 856, optical sensor 864, optical sensor controller 858, contact/motion module 830, graphics module 832, text input module 834, and telephone module 838, videoconferencing module 839 includes executable instructions to initiate, conduct, and terminate a video conference between a user and one or more other participants in accordance with user instructions.

In conjunction with touch screen 812, display controller 856, optical sensor(s) 864, optical sensor controller 858, contact/motion module 830, graphics module 832, and image management module 844, camera module 843 includes executable instructions to capture still images or video (including a video stream) and store them into memory 802, modify characteristics of a still image or video, or delete a still image or video from memory 802.

In conjunction with touch screen 812, display controller 856, contact/motion module 830, graphics module 832, text input module 834, and camera module 843, image management module 844 includes executable instructions to arrange, modify (e.g., edit), or otherwise manipulate, label, delete, present (e.g., in a digital slide show or album), and store still and/or video images.

In conjunction with RF circuitry 808, touch screen 812, display system controller 856, contact/motion module 830, graphics module 832, and text input module 834, browser module 847 includes executable instructions to browse the Internet in accordance with user instructions, including searching, linking to, receiving, and displaying web pages or portions thereof, as well as attachments and other files linked to web pages.

In conjunction with touch screen 812, display system controller 856, contact/motion module 830, graphics module 832, and text input module 834, search module 851 includes executable instructions to search for text, music, sound, image, video, and/or other files in memory 802 that match one or more search criteria (e.g., one or more user-specified search terms) in accordance with user instructions.

In conjunction with touch screen 812, display system controller 856, contact/motion module 830, graphics module 832, audio circuitry 810, speaker 811, RF circuitry 808, and browser module 847, video and music player module 852 includes executable instructions that allow the user to download and play back recorded music and other sound files stored in one or more file formats, such as MP3 or AAC files, and executable instructions to display, present or otherwise play back videos (e.g., on touch screen 812 or on an external, connected display via external port 824). In some embodiments, device 800 may include the functionality of an MP3 player.

In conjunction with touch screen 812, display system controller 856, contact/motion module 830, graphics module 832, audio circuitry 810, speaker 811, RF circuitry 808, text input module 834, and browser module 847, online video module 855 includes instructions that allow the user to access, browse, receive (e.g., by streaming and/or download), play back (e.g., on the touch screen or on an external, connected display via external port 824), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 802 may store a subset of the modules and data structures identified above. Furthermore, memory 802 may store additional modules and data structures not described above.

In some embodiments, device 800 is a device where operation of a predefined set of functions on the device is performed exclusively through a touch screen and/or a touchpad. By using a touch screen and/or a touchpad as the primary input control device for operation of device 800, the number of physical input control devices (such as push buttons, dials, and the like) on device 800 may be reduced.

The predefined set of functions that may be performed exclusively through a touch screen and/or a touchpad include navigation between user interfaces. In some embodiments, the touchpad, when touched by the user, navigates device 800 to a main, home, or root menu from any user interface that may be displayed on device 800. In such embodiments, the touchpad may be referred to as a "menu button." In some other embodiments, the menu button may be a physical push button or other physical input control device instead of a touchpad.

Figure 9:
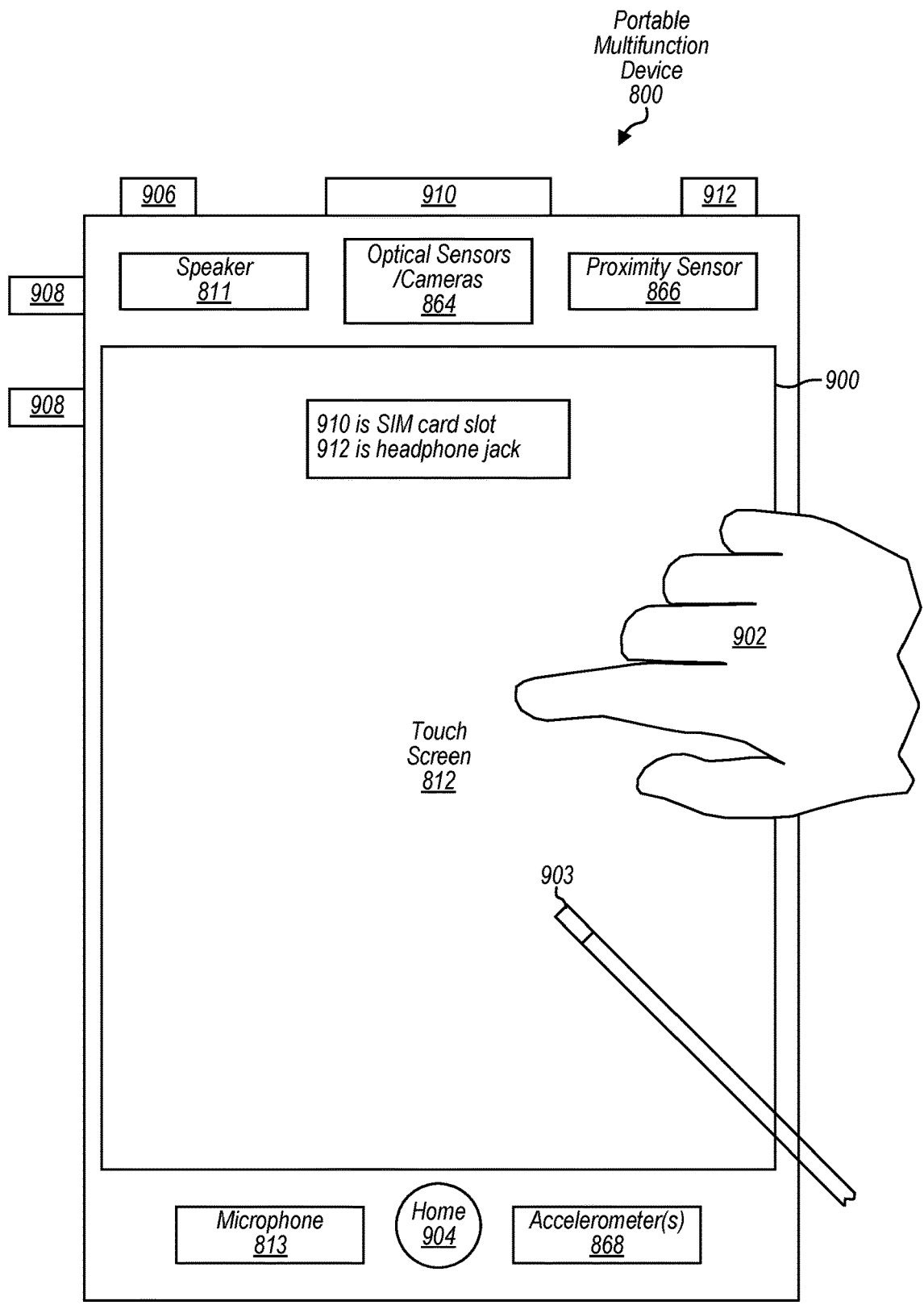
FIG. 9 depicts a portable multifunction device that may include a camera having a suspension spring structure and/or one or more end stop bumpers, in accordance with some embodiments.

FIG. 9 depicts a portable multifunction device 800 that may include a camera having a suspension spring structure and/or an end stop bumper, in accordance with some embodiments. In some embodiments, the device 800 may include one or multiple features, components, and/or functionality of embodiments described herein with reference to FIGS. 1-8 and 10.

The device 800 may have a touch screen 812. The touch screen 812 may display one or more graphics within user interface (UI) 900. In this embodiment, as well as others described below, a user may select one or more of the graphics by making a gesture on the graphics, for example, with one or more fingers 902 (not drawn to scale in the figure) or one or more styluses 903 (not drawn to scale in the figure).

Device 800 may also include one or more physical buttons, such as "home" or menu button 904. As described previously, menu button 904 may be used to navigate to any application 836 in a set of applications that may be executed on device 800. Alternatively, in some embodiments, the menu button 904 is implemented as a soft key in a GUI displayed on touch screen 812.

In one embodiment, device 800 includes touch screen 812, menu button 904, push button 906 for powering the device on/off and locking the device, volume adjustment button(s) 908, Subscriber Identity Module (SIM) card slot 910, head set jack 912, and docking/charging external port 824. Push button 906 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the examples herein are given with reference to optical sensor(s)/camera(s) 864 (on the front of a device), one or more rear-facing cameras or optical sensors that are pointed opposite from the display may be used instead of, or in addition to, an optical sensor(s)/camera(s) 864 on the front of a device.

Figure 10:
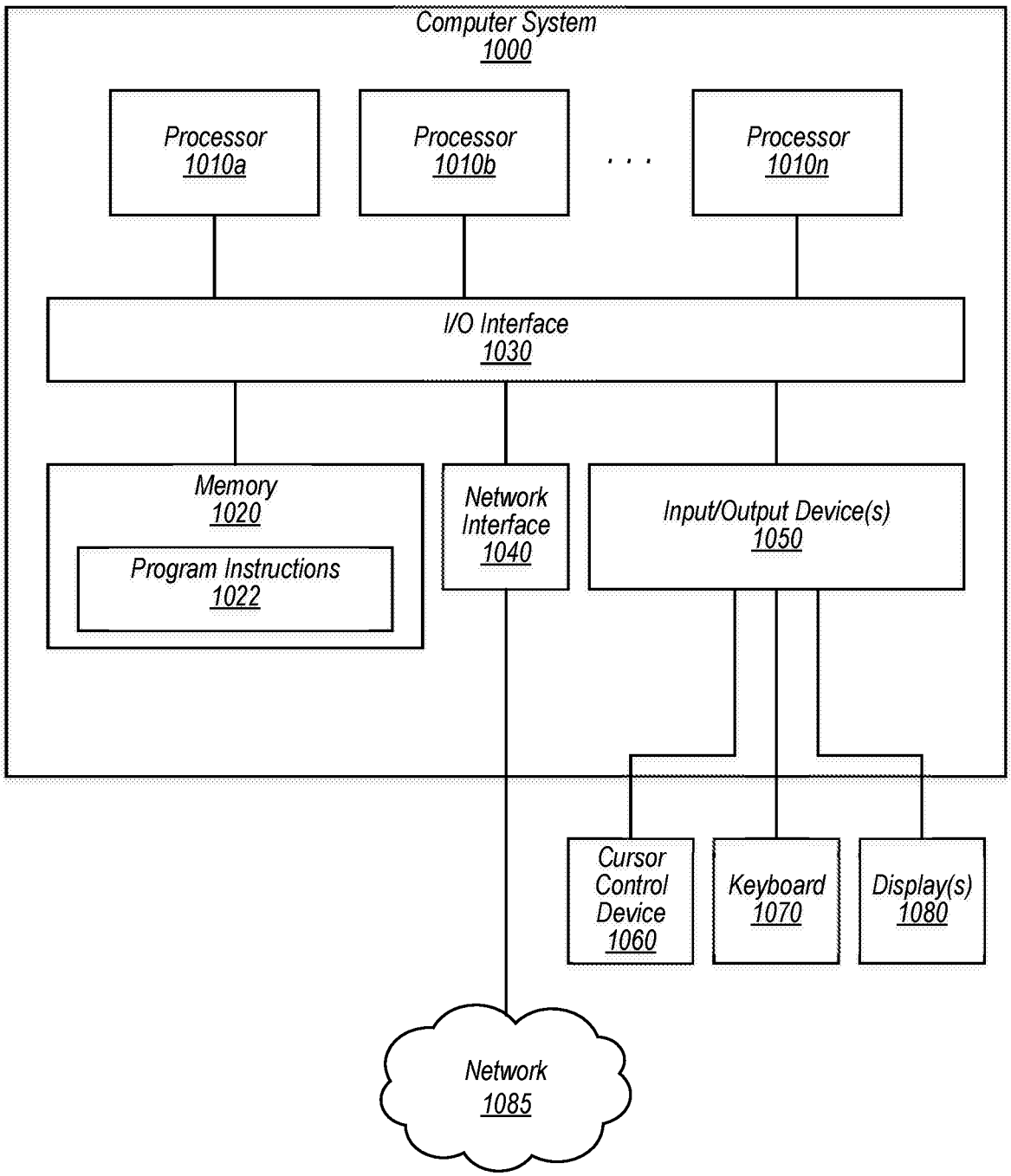
FIG. 10 illustrates an example computer system that may include a camera having a suspension spring structure and/or one or more end stop bumpers, in accordance with some embodiments.

FIG. 10 illustrates an example computer system 1000 that may include a camera having a suspension spring structure and/or an end stop bumper, in accordance with some embodiments. In some embodiments, the computer system 1000 may include one or multiple features, components, and/or functionality of embodiments described herein with reference to FIGS. 1-9.

The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. Additionally, existing camera control data 1032 of memory 1020 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a lens group comprising one or more lens elements that define an optical axis;
an image sensor to capture light that passes through the lens group;
an actuator to move the lens group relative to the image sensor;
a suspension platform coupled to the lens group such that the suspension platform and the lens group are moveable together in a direction orthogonal to the optical axis, the suspension platform including an outer surface portion;
a stationary structure including an inner surface portion that defines a lateral end stop with respect to movement of the suspension platform in the direction orthogonal to the optical axis; and
a bumper, distinct from the outer surface portion of the suspension platform and at least partially disposed between the outer surface portion of the suspension platform and the lateral end stop, wherein the bumper is configured to increasingly deflect into an open space created by a shape of the bumper to cushion movement of the suspension platform in the direction orthogonal to the optical axis as the outer surface portion of the suspension platform increasingly approaches the lateral end stop.

2. The camera of claim 1, wherein:
the bumper is part of a suspension spring structure that is coupled to the suspension platform; and
the suspension spring structure is to suspend the lens group within the suspension platform and guide movement of the lens group along the optical axis.

3. The camera of claim 2, wherein:
the camera further comprises a lens carrier to which the lens group is fixedly attached;
the actuator comprises a coil and a magnet;
the suspension platform comprises a magnet holder to which the magnet is attached; and
the suspension spring structure couples the lens carrier with the magnet holder such that the lens carrier is moveable, along the optical axis, relative to the magnet holder.

4. The camera of claim 3, wherein:
the actuator is to:
move the lens carrier, along the optical axis, relative to the magnet holder and the image sensor to provide autofocus (AF) movement of an image captured via image sensor; and
move the lens carrier and the magnet holder, in at least the direction orthogonal to the optical axis, relative to the image sensor to provide optical image stabilization (OIS) movement of the image;
the suspension spring structure comprises an AF suspension spring to guide movement of the lens carrier relative to the magnet holder and the image sensor to facilitate the AF movement; and
the camera further comprises:
an OIS suspension structure to guide movement of the lens carrier and the magnet holder relative to the image sensor to facilitate the OIS movement.

5. The camera of claim 1, wherein:
the stationary structure comprises a shield can that at least partially encompasses the suspension platform; and
the shield can is stationary relative to movement of the suspension platform.

6. A device, comprising:
one or more processors;
memory storing program instructions executable by the one or more processors to control operation of a camera; and
the camera, comprising:
a lens group comprising one or more lens elements that define an optical axis;
an image sensor to capture light that passes through the lens group;
an actuator to move the lens group relative to the image sensor;
a suspension platform coupled to the lens group such that the suspension platform and the lens group are moveable together in a direction orthogonal to the optical axis;
a stationary structure that defines a lateral end stop with respect to movement of the suspension platform in the direction orthogonal to the optical axis; and
a bumper, distinct from an outer surface portion of the suspension platform and at least partially disposed between the suspension platform and the lateral end stop, wherein the bumper is configured to increasingly deflect into an open space created by a shape of the bumper to cushion movement of the suspension platform in the direction orthogonal to the optical axis as the suspension platform approaches the lateral end stop.

7. The device of claim 6, wherein:
the bumper is part of a suspension spring structure that is coupled to the suspension platform; and
the suspension spring structure comprises one or more spring elements to guide movement of the lens group along the optical axis.

8. The device of claim 7, wherein the suspension spring structure extends along a plane that is orthogonal to the optical axis.

9. The device of claim 7, wherein:
the camera further comprises a lens carrier to which the lens group is fixedly attached;
the actuator comprises a coil and a magnet;
the suspension platform comprises a magnet holder to which the magnet is attached; and
the suspension spring structure couples the lens carrier with the magnet holder such that the lens carrier is moveable, along the optical axis, relative to the magnet holder.

10. The device of claim 9, wherein the one or more processors are further to:
cause the actuator to move the lens carrier, along the optical axis, relative to the magnet holder and the image sensor to provide autofocus (AF) movement of an image captured via the image sensor; and
cause the actuator to move the lens carrier and the magnet holder, in at least the direction orthogonal to the optical axis, relative to the image sensor to provide optical image stabilization (OIS) movement of the image.

11. The device of claim 6, wherein:
the suspension platform comprises an outer surface portion;
the stationary structure comprises an inner surface portion that defines the lateral end stop; and
the bumper is at least partially disposed between the outer surface portion of the suspension platform and the lateral end stop.

12. The device of claim 6, wherein the bumper comprises:
a first protrusion having a first end portion disposed between the suspension platform and the lateral end stop, wherein the first end portion extends in a first direction; and
a second protrusion having a second end portion disposed between the suspension platform and the lateral end stop, wherein:
the second end portion extends in a second direction that is opposite the first direction; and
the second end portion is spaced apart from the first end portion by a gap.

13. The device of claim 6, wherein:
the stationary structure comprises a shield can;
the bumper is a first bumper proximate a first side of the shield can; and
the device further comprises:
a second bumper proximate a second side of the shield can that is opposite the first side of the shield can;
a third bumper proximate a third side of the shield can; and
a fourth bumper proximate a fourth side of the shield can that is opposite the third side of the shield can.

14. The device of claim 6, wherein the bumper is to:
interface with the lateral end stop when movement of the bumper, in the direction orthogonal to the optical axis, satisfies a threshold distance; and
deflect in at least one direction that is opposite the direction orthogonal to the optical axis, as the bumper interfaces with the lateral end stop and approaches the lateral end stop.

15. The device of claim 6, wherein the bumper at least partially extends between the suspension platform and the stationary structure to enforce a clearance between the suspension platform and the stationary structure, so as to limit an amount of electrostatic charge accumulation on the suspension platform.

16. An optics suspension system, comprising:
a suspension platform coupled to a lens group of a camera such that the suspension platform and the lens group are moveable together in a direction orthogonal to an optical axis defined by the lens group, wherein an actuator of the camera is to move the lens group relative to an image sensor of the camera; and
a bumper, distinct from an outer surface portion of the suspension platform and at least partially disposed between the suspension platform and a lateral end stop with respect to movement of the suspension platform in the direction orthogonal to the optical axis, wherein:
the lateral end stop is defined by a stationary structure of the camera; and
the bumper comprises a flexure having one or more bends allowing at least a portion of the bumper to increasingly deflect, into an open space created by a shape of the bumper, away from the lateral end stop to cushion movement of the suspension platform in the direction orthogonal to the optical axis as the suspension platform approaches the lateral end stop.

17. The optics suspension system of claim 16, wherein:
the actuator comprises a voice coil motor (VCM) actuator that includes a magnet and a coil;
the suspension platform comprises a magnet holder to which the magnet is attached;
the bumper is part of a suspension spring structure that couples the magnet holder with a lens carrier to which the lens group is attached, such that the lens carrier is moveable, along the optical axis, relative to the magnet holder;
the stationary structure comprises a shield can that is to at least partially encompass the suspension platform; and
the shield can is stationary relative to movement of the suspension platform.

18. The optics suspension system of claim 17, wherein:
the suspension platform comprises an outer surface of a side of the magnet holder, the outer surface defining a first plane that is parallel to the optical axis;
the stationary structure comprises an inner surface of a side of the shield can, the inner surface defining a second plane that is parallel to the optical axis; and
the bumper is at least partially disposed between the first plane and the second plane.

19. The optics suspension system of claim 17, wherein:
the suspension spring structure further comprises:
a first frame portion attached to the magnet holder;
a second frame portion attached to the lens carrier; and
one or more spring elements that extend from the first frame portion to the second frame portion; and
the bumper comprises:
a first protrusion that extends from the first frame portion, the first protrusion having a first end portion that extends in a first direction; and
a second protrusion that extends from the first frame portion, the second protrusion having a second end portion that extends in a second direction that is opposite the first direction, the second end portion being spaced apart from the first end portion by a gap;
wherein the flexure comprises the first protrusion or the second protrusion.

20. The optics suspension system of claim 16, wherein the bumper is formed of sheet metal.

* * * * *